United States Patent
Nadji et al.

(10) Patent No.: US 9,973,964 B2
(45) Date of Patent: *May 15, 2018

(54) ENTERPRISE COGNITIVE RADIO INTEGRATED WITH LASER COMMUNICATIONS

(71) Applicant: AT&T Intellectual Property II, L.P., Atlanta, GA (US)

(72) Inventors: Behzad Nadji, Tiburon, CA (US); Mostafa Tofighbakhsh, Cupertino, CA (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/495,040

(22) Filed: Apr. 24, 2017

(65) Prior Publication Data

US 2017/0230859 A1 Aug. 10, 2017

Related U.S. Application Data

(63) Continuation of application No. 14/986,796, filed on Jan. 4, 2016, now Pat. No. 9,668,163, which is a continuation of application No. 13/958,800, filed on Aug. 5, 2013, now Pat. No. 9,276,859, which is a continuation of application No. 11/316,453, filed on Dec. 22, 2005, now Pat. No. 8,526,403.

(51) Int. Cl.
| | |
|---|---|
| *H04W 28/02* | (2009.01) |
| *H04B 10/112* | (2013.01) |
| *H04W 76/02* | (2009.01) |

(52) U.S. Cl.
CPC ...... *H04W 28/0268* (2013.01); *H04B 10/112* (2013.01); *H04W 28/0215* (2013.01); *H04W 76/023* (2013.01)

(58) Field of Classification Search
CPC .............. H04B 10/114; H04B 10/1125; H04L 29/06027; H04W 28/0215; H04W 48/18
See application file for complete search history.

(56) References Cited

U.S. PATENT DOCUMENTS

| | | |
|---|---|---|
| 5,583,914 A | 12/1996 | Chang et al. |
| 6,763,195 B1 | 7/2004 | Willebrand et al. |
| 2002/0101632 A1 | 8/2002 | Meckler |
| 2004/0022222 A1 | 2/2004 | Clisham |
| 2005/0071733 A1 | 3/2005 | Fukae et al. |
| 2005/0200456 A1* | 9/2005 | Bridgelall ............. H04W 48/18 340/10.1 |
| 2006/0176149 A1 | 8/2006 | Douglas |
| 2007/0011604 A1 | 1/2007 | Chiu |

* cited by examiner

*Primary Examiner* — Andrew Lai
*Assistant Examiner* — Leon Andrews

(57) ABSTRACT

A wireless data access system is provided to ameliorate bursty traffic occurring in a radio communications link such as a WiFi, WiMAX, 3G or cellular telephone link to a wireless network access device. A data traffic event is detected relating to traffic in the link. The traffic event may be a traffic burst exceeding a predetermined threshold. Based on detecting the data traffic event, a free-space optical communications link is established to the network access device to handle the traffic burst. The established radio link may be used to set-up and coordinate the free-space optical link.

20 Claims, 3 Drawing Sheets

ENTERPRISE COGNITIVE RADIO INTEGRATED WITH LASER COMMUNICATIONS

RELATED APPLICATIONS

This application is a continuation of application Ser. No. 14/986,796, entitled "Enterprise Cognitive Radio Integrated with Laser Communications," filed on Jan. 4, 2016, now U.S. Pat. No. 9,668,163 issued on May 30, 2017, which is a continuation of application Ser. No. 13/958,800, entitled "Enterprise Cognitive Radio Integrated with Laser Communications," filed on Aug. 5, 2013, now U.S. Pat. No. 9,276,859 issued on Mar. 1, 2016, which is a continuation of application Ser. No. 11/316,453, entitled "Enterprise Cognitive Radio Integrated with Laser Communications," filed on Dec. 22, 2005, now U.S. Pat. No. 8,526,403 issued on Sep. 3, 2013, the contents of which are hereby incorporated by reference herein in their entirety.

FIELD OF THE INVENTION

The present invention relates generally to wireless data access systems, and more particularly to a technique for exchanging highly burstable files/media/data on an as-needed basis, using free-space optical communications coordinated by a radio control/synchronization channel.

BACKGROUND OF THE INVENTION

Independent wireless network access devices often operate in a cell, "hotspot" or situation in which the access device competes with other access devices for banadwidth, connection time and other resources. That condition may limit speed and Quality of Service (QoS) in situations where the access device is required to perform a "bursty" operation such as the downloading of a large file. Such "bursty traffic may also cause interference with the connections of other network access devices, cause channel over-utilization and increase power consumption of the network access device.

For example, local area wireless networks are being deployed in increasing numbers to bring broadband services to greater numbers of fixed, ambulatory and mobile users. Those wireless local area network are often used to download email with attachments, media files and other data-intensive operations. As "bursty" network usage becomes more common, it has become a significant challenge to maintain QoS and provide greater bandwidth capabilities to increasing numbers of customers.

A paradigm called "cognitive radio" has been used in wireless networks to ameliorate the above described problem. A cognitive radio system changes particular parameters of radio transmission or reception in either the network or a particular wireless node, based on the observation of various parameters in the radio environment. For example, transmissions may be shifted from one radio frequency to another within the allowed spectrum, based on observed atmospheric conditions and interference from other local transmitters. Other radio transmission parameters may also be adjusted to optimize transmission, given the environmental conditions, user behavior, network state, or other factors.

While cognitive radio principles have been used with some success in more efficiently using RF bandwidth within a wireless network such as a cellular telephone network, a 3G radio network or a WiFi network, such techniques are limited by the amount of RF bandwidth available under FCC regulations. If a data burst requires bandwidth beyond that which can be provided over the available RF frequencies, a bottleneck occurs.

There is therefore a need for a system that is capable of handling large bursts of data without degrading transmission speed or QoS. The system should not require RF spectrum beyond that which is available for the particular wireless technology used in the system.

SUMMARY OF THE INVENTION

The present invention addresses the needs described above in a method for providing wireless network services. The method comprises the steps of establishing a first communications link to a network access device, detecting a data traffic event relating to traffic in the link, and, based on detecting the data traffic event, establishing a free-space optical communications link to the network access device.

The method may further include the step of coordinating the free-space optical communications link using the first communications link. The step of coordinating the free-space optical communications link may further include passing session management information, or passing GPS location information, or passing beam timing information.

The first communications link may be a radio communications link. The radio communications link may be an IEEE 802.11x-compliant radio link. The link may be selected from a group consisting of WiFi, WiMAX and 3G radio links. The radio communication link may alternatively be a cellular telephone link.

The step of detecting a data traffic event may include detecting a threshold minimum traffic level, or may include detecting a metric relating to power consumption.

In another embodiment of the invention, a network access point is provided for coordinating communication among network access devices in a network. The access point includes a processor, a radio transceiver connected to the processor for establishing a radio link with a first network access device, a free space optical transceiver connected to the processor for establishing a free space optical link with the first network access device, and a computer readable medium accessible by the processor and containing instructions. Those instructions, when executed by the processor, cause the processor to monitor the radio link with the first network access device for a traffic event, and, based on an occurrence of a traffic event, to cause the processor to establish a free space optical connection through the free space optical transceiver to the first network access device.

The computer readable medium may further contain instructions that, when executed by the processor, cause the processor to coordinate the free-space optical communications link using the radio link. The processor may coordinate the free-space optical communications link using the radio link by passing session management information, or by passing beam timing information. The processor may coordinate the free-space optical communications link using the radio link based at least in part on GPS location information.

The radio link may be an IEEE 802.11x-compliant radio link, and may be selected from a group consisting of WiFi, WiMAX 3G and cellular telephone radio links.

The computer readable medium may further contain instructions that, when executed by the processor, cause the processor to monitor the radio link with the first network access device for a traffic event by detecting a threshold minimum traffic level, or by detecting a metric relating to power consumption.

Another embodiment of the invention is another method for providing wireless local area network services. The method includes the steps of establishing a first communications link between a first network access device and a second network access device, detecting a data traffic event relating to traffic between the first and second network access devices, and, based on detecting the data traffic event, establishing a free-space optical communications link between the first and second network access devices.

DESCRIPTION OF THE INVENTION

The present invention overcomes the above-described problems by providing a technique and apparatus for use in a wireless network whereby, upon detection of a data traffic event such as a burst in data volume, a free space optical connection is established to absorb some or all of the traffic volume. The original wireless connection may be used to coordinate the free space optical connection.

Figure 1:
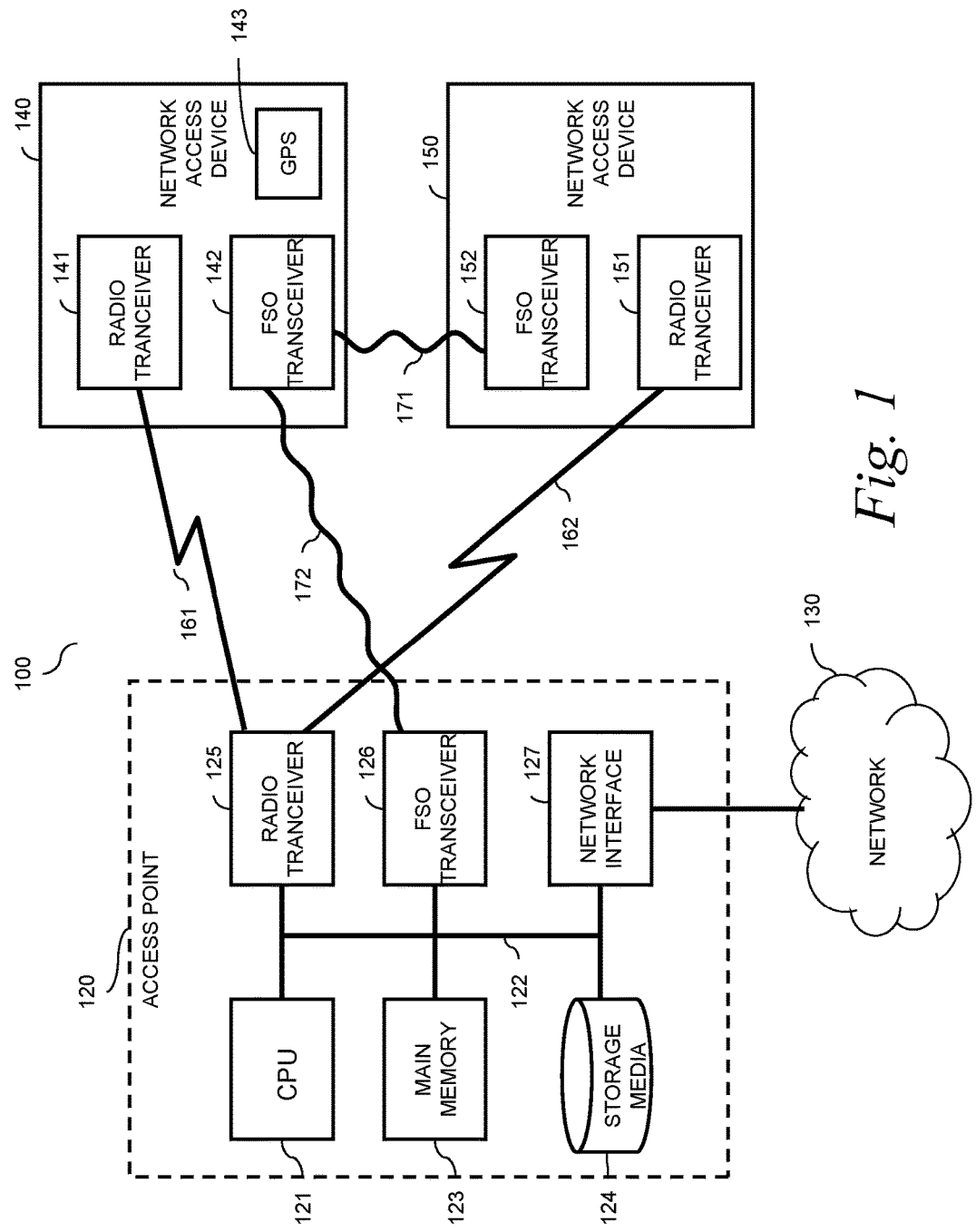
FIG. 1 is a schematic representation of a system according to one embodiment of the invention.

An exemplary wireless network system 100 in accordance with the invention is shown in FIG. 1. Network access devices 140 and 150 access the network through an access point 120. For example, in an IEEE 802.11 wireless network, the network access devices 140, 150 establish radio communication links 161, 162, respectively, with the network access point 120. The access device 140 includes a radio transceiver 141 for communicating with a radio transceiver 125 in the access point 120. Similarly, access device 150 includes a radio transceiver 151.

The access point 120 includes a central processing unit (CPU) 121, main memory 123 and storage media 124, interconnected by a system bus 122. The media stores instructions that are loaded into main memory, and are executed by the CPU to perform tasks in accordance with the invention.

The access point 120 further comprises the radio transceiver 125 as discussed above, and a network interface 127 for connecting with a network 130 such as the Internet.

In accordance with the invention, the network access devices 140, 150 also include or have access to free space optical (FSO) transceivers 142, 152, respectively. The access point 120 also includes an FSO transceiver 126.

Figure 2:
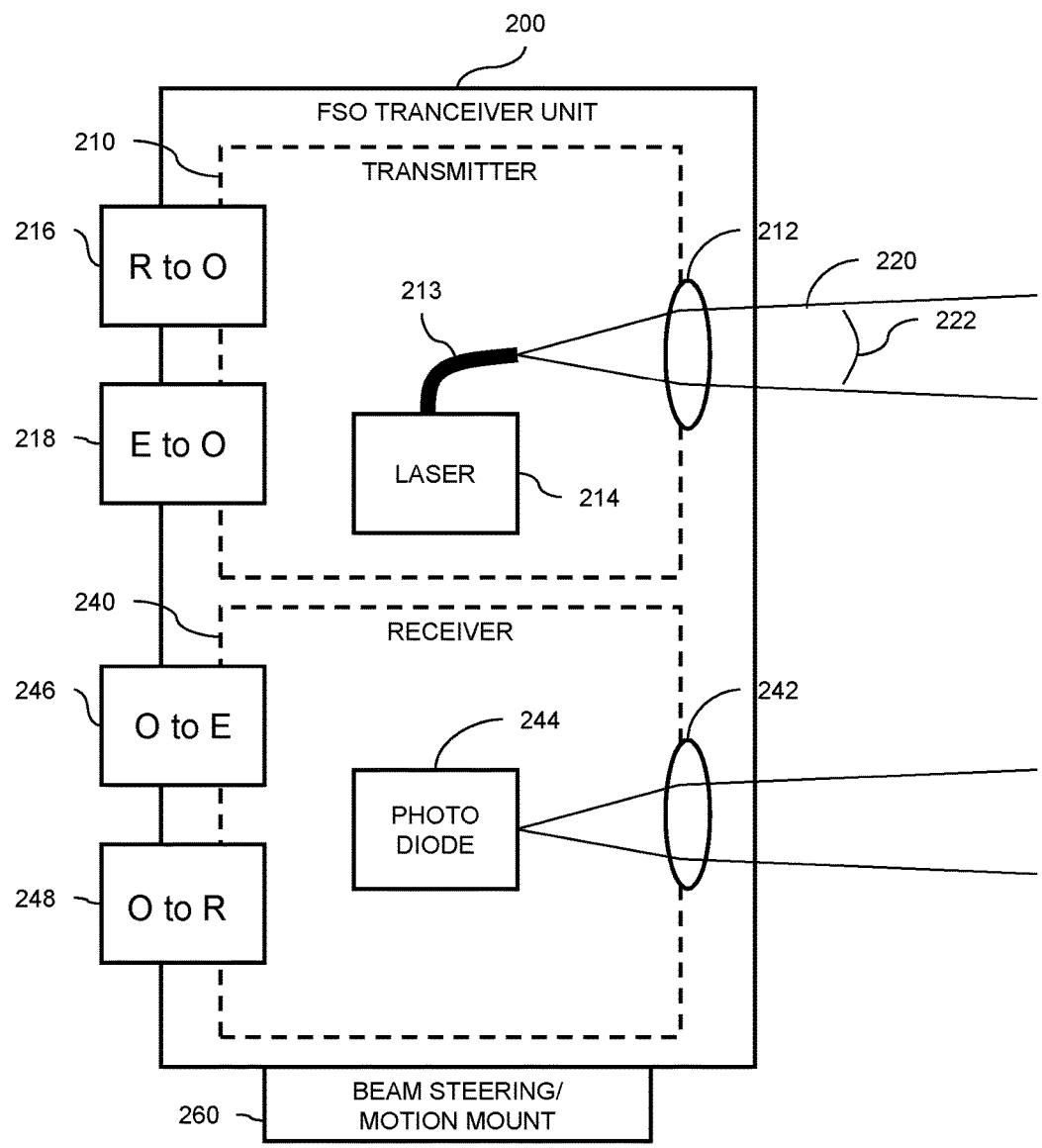
FIG. 2 is a schematic representation of an FSO transceiver unit according to one embodiment of the invention.

An exemplary FSO transceiver unit 200 is shown schematically in FIG. 2. That FSO transceiver unit comprises both a transmitter unit 210 and a receiver unit 240. The transmitter unit 210 includes one or more lenses 212 (or equivalent lens and mirror configurations), that are designed to transmit modulated optical energy received either from an optical fiber 213 attached to a suitable laser or LED source 214, or directly from a laser or LED source located at or near the focus of the lens. The optical modulation of the free space optical link utilizes methods that are well demonstrated in the art in such applications as "radio on fiber" or hybrid fiber/radio (HFR). For example, the output of the transceiver transmitter 210 may be amplitude modulated, thus replicating in the optical domain the 802.11 radio transmission. In that case, an "R to O" or "Radio signal to Optical signal" module 216 feeds the FSO transmitter 210. Similarly, the optical modulator may be capable of converting electronic signals or wired network link technology such as the Ethernet to optical signals, shown schematically in FIG. 2 as "E to O" module 218. In some designs, a single device (not shown) may accomplish both types of modulations. The transceiver "transmitter" lens 212 or lens array will receive that modulated optical energy from its source and reconfigure the optical energy into a beam 220 with a selectable divergence angle 222 suitable for transmission of this beam through the air to a distant receiver.

The receiver unit 240 comprises a lens, lens array and/or mirror configuration 242 designed to collect the transmitted and modulated optical energy from a distant transmitter unit and focus that collected energy onto a suitable transceiver "receiver" photodiode 244. The optical signal is demodulated back into the electrical domain by an optics-to-electronics conversion module 246 or an optics-to-radio conversion module 248.

In a preferred embodiment of the invention, the FSO transceiver assembly 200 uses beam steering and track methods to maintain link alignment. A motion mount 260 allows for independent position alignment for FSO link reconfiguration considerations. Such beam steering and tracking devices are available, for example, from Omnilux Inc. and from AirFiber of San Diego, Calif.

With the ability to transmit 802.11 RF signals directly in the optical domain, data traffic can be transmitted directly from network access device to network access device, as represented by optical beam 171 (FIG. 1), or from a network access device to a network access point, as represented by optical beam 172. The FSO access point may be the same access point used for radio communications in the network, or may be a different access point.

Figure 3:
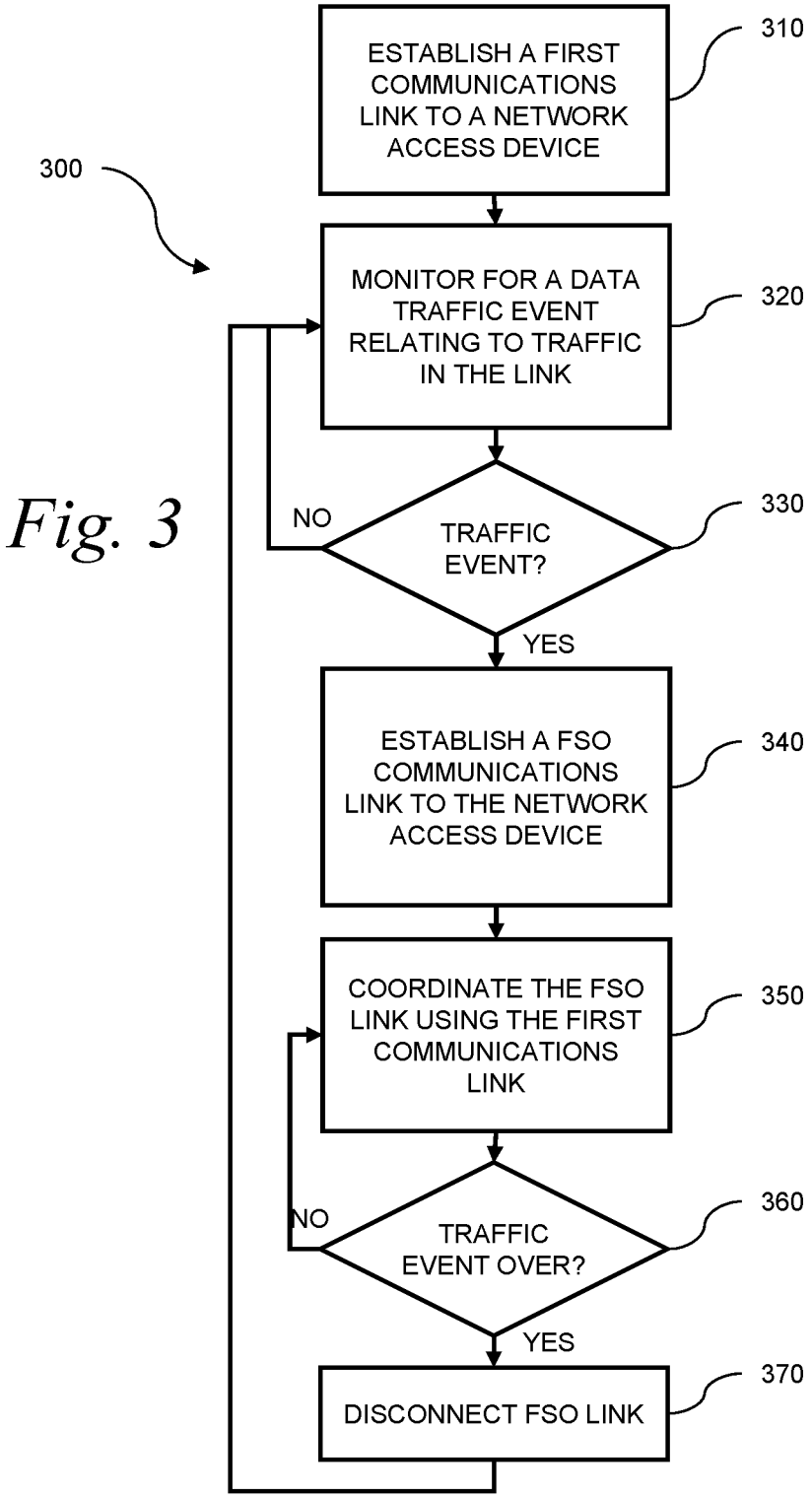
FIG. 3 is a flow chart representing a method according to one embodiment of the invention.

As illustrated in FIG. 3, an exemplary method 300 in accordance with the invention begins with establishing (step 310) a first communications link to a network access device. In a preferred embodiment of the invention, the first communications link is a radio link such as a WiFi, WiMAX, 3G and cellular telephone radio link.

The link is monitored (step 320) for a traffic event relating to traffic in the link. In one embodiment of the invention, the link is monitored directly through a tap, and a minimum number of bits per second or another traffic volume measurement triggers a traffic event. Alternatively, another element reflective of current or imminent data flow in the link is monitored. For example, an outgoing data buffer may be monitored and a traffic event detected when the data buffer reaches a certain size. In another example, file requests are monitored and a traffic event is triggered when a file of a threshold size is requested or is about to be sent, or when a threshold quantity of data is requested within a predetermined time period. The data traffic may be monitored by the processor 121 in the access point 120 (FIG. 1) or from a processor (not shown) in the network access device 140. Other data traffic monitoring schemes will be apparent to those skilled in the art.

Upon detection of a traffic event (decision 330), a free-space optical communications link is established (step 340) for carrying some or all of the traffic exchanged between the devices connected by the first communications link. In a preferred embodiment, the FSO link is coordinated (step 350) using the first communications link. For example, the FSO link set-up may be coordinated by an existing radio link between the access point 120 and the network access device 140.

The coordination may include transmitting GPS location information for the access device 140, the location information being obtained from a GPS receiver 143 associated with the device. Through database lookup engines, it is possible to determine, based on GPS coordinate data, the locations of various access points available to an end device. In addition, the GPS data reveals where the end devices are, for route optimization and policy enforcements based on locations. Physical beam aiming may be assisted based on GPS data and the known location data of an access point.

Beam aiming, beam synchronization and other physical protocols, as well as upper layer protocols, may be implemented through coordination using the radio link. Beam aiming is preferably accomplished through peer to peer protocol, assuming that routing optimization can be done by the network. In ad hoc networks, the end devices must execute a thin protocol to synchronize the FSO beams at each other.

The system of the invention may furthermore monitor data traffic (decision 360) to determine the point at which the FSO link is no longer necessary. The FSO link is then disconnected (step 370) and the system returns to monitoring for a data traffic event (step 320).

The optical channel is preferably utilized in the system of the invention for terminal policies. For example, in an airport environment, as planes are about to take off, or immediately after they land, there may be significant bandwidth overload due to spectrum limitation in the area. FSO can be used to upload or download the personal media of the passengers on the plane. The amount of data may be so massive that radio will not support it. An active, synchronized FSO channel under those circumstances is capable of handling the resulting burst of data.

The inventive system has many advantages over a cognitive radio. For example, depending on the environment in which the system is being used, interference among radio channels may be greatly reduced. Further, channel usage is optimized. In a large metropolitan area, traffic models must currently accommodate bursty traffic patterns, using store and forward techniques.

Power management is greatly enhanced in handheld network access devices such as cell phones, PDAs and laptops. In current systems, significant power is consumed in channel scanning to find an available path for data bursts. The present invention eliminates that need because each network access device can access an access point with high bandwidth on demand. For example, email inboxes with attachments may be downloaded without monitoring radio frequencies for an available channel.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein primarily with respect to use with wireless radio systems incorporating the IEEE 802.11 MAC protocol standard, the method and apparatus of the invention may be used in conjunction with access points using other access control standards such as wireless cellular telephony. It is to be understood that the embodiments shown and described herein are only illustrative of the principles of the present invention and that various modifications may be implemented by those skilled in the art without departing from the scope and spirit of the invention.

What is claimed is:

1. A method, comprising:
    establishing a first wireless radio link for transmitting data traffic between a network access device and a first wireless access point, the first wireless radio link being part of a first communications link between the network access device and a second network access device independent from the network access device, the first communications link comprising the first wireless radio link and a second wireless radio link for transmitting the data traffic between the second network access device and the first wireless access point;
    based on a detection of a data traffic event relating to the data traffic in the first communications link, establishing a direct free-space optical communications link transmitting a portion of the data traffic from the network access device to the second network access device, whereby the portion of the data traffic transmitted by the direct free-space optical communications link bypasses the first wireless access point; and
    receiving by the network access device, via a link with a coordinating wireless access point, session management information for coordinating the direct free-space optical communications link.

2. The method of claim 1 wherein the coordinating wireless access point is the first wireless access point.

3. The method of claim 1 wherein the coordinating wireless access point is a wireless access point different from the first wireless access point.

4. The method of claim 1, wherein the session management information comprises location information for aiming a beam carrying the direct free-space optical communications link.

5. The method of claim 1, wherein the session management information comprises beam timing information.

6. The method of claim 1 wherein the detection of a data traffic event comprises a detection of a threshold minimum traffic level.

7. The method of claim 1 wherein the detection of a data traffic event comprises a detection of a metric relating to power consumption.

8. A non-transitory computer-readable storage device having stored thereon computer readable instructions, wherein execution of the computer readable instructions by a processor causes the processor to perform operations comprising:
    establishing a first wireless radio link for transmitting data traffic between a network access device and a first wireless access point, the first wireless radio link being part of a first communications link between the network access device and a second network access device independent from the network access device, the first communications link comprising the first wireless radio link and a second wireless radio link for transmitting the data traffic between the second network access device and the first wireless access point;
    establishing a direct free-space optical communications link for transmitting a portion of the data traffic from the network access device to the second network access device upon detection of a data traffic event relating to the data traffic in the first communications link, whereby the portion of the data traffic transmitted by the direct free-space optical communications link bypasses the first wireless access point; and
    receiving by the network access device, via a link with a coordinating wireless access point, session management information for coordinating the direct free-space optical communications link.

9. The non-transitory computer-readable storage device of claim 8, wherein the session management information comprises location information for aiming a beam carrying the direct free-space optical communications link.

10. The non-transitory computer-readable storage device of claim 8, wherein the session management information comprises beam timing information.

11. The non-transitory computer-readable storage device of claim 8, wherein the first and second wireless radio links are Institute of Electrical and Electronics Engineers (IEEE) 802.11-compliant radio links.

12. The non-transitory computer-readable storage device of claim 8, wherein the first and second wireless radio links are radio links selected from a group consisting of wireless local area networks, Worldwide Interoperability for Microwave Access (WiMAX), third generation (3G) and cellular telephone radio links.

13. The non-transitory computer-readable storage device of claim 8, wherein the detection of a data traffic event comprises a detection of a threshold minimum traffic level.

14. The non-transitory computer-readable storage device of claim 8, wherein the detection of a data traffic event comprises a detection of a metric relating to power consumption.

15. A network access device, comprising:
a processor;
a radio transceiver connected for control by the processor;
a free-space optical transceiver connected for control by the processor;
a non-transitory computer-readable storage device having stored thereon computer readable instructions, wherein execution of the computer readable instructions by the processor causes the network access device to perform operations comprising:
establishing a first wireless radio link for transmitting data traffic via the radio transceiver between the network access device and a first wireless access point, the first wireless radio link being part of a first communications link between the network access device and a second network access device independent from the network access device, the first communications link comprising the first wireless radio link and a second wireless radio link for transmitting the data traffic between the second network access device and the first wireless access point;
based on a detection of a data traffic event relating to the data traffic in the first communications link, establishing a direct free-space optical communications link transmitting a portion of the data traffic from the network access device to the second network access device, whereby the portion of the data traffic transmitted by the direct free-space optical communications link bypasses the first wireless access point; and
receiving, via a link between the network access device and a coordinating wireless access point, session management information for coordinating the direct free-space optical communications link.

16. The network access device of claim 15 wherein the coordinating wireless access point is the first wireless access point.

17. The network access device of claim 15 wherein the coordinating wireless access point is a wireless access point different from the first wireless access point.

18. The network access device of claim 15, wherein the session management information comprises location information for aiming a beam carrying the direct free-space optical communications link.

19. The network access device of claim 15, wherein the session management information comprises beam timing information.

20. The network access device of claim 15, wherein the detection of a data traffic event comprises a detection of a threshold minimum traffic level.

* * * * *